United States Patent [19]

Chen

[11] Patent Number: 5,875,808
[45] Date of Patent: Mar. 2, 1999

[54] BURNPROOF DEVICE OF TRIPLE/DOUBLE SWITCH COMBINATION FAUCET

[75] Inventor: Cheng-Tong Chen, Changhua Hsien, Taiwan

[73] Assignee: Tai Yi Tong Industrial Co., Ltd., Changhua Hsien, Taiwan

[21] Appl. No.: 989,005

[22] Filed: Dec. 11, 1997

[51] Int. Cl.$^6$ ................................................. G05D 11/16
[52] U.S. Cl. .......................................... 137/100; 137/606
[58] Field of Search ............................. 137/98, 100, 114, 137/606

[56] References Cited

U.S. PATENT DOCUMENTS

| | | | |
|---|---|---|---|
| 2,090,843 | 8/1937 | King | 137/98 |
| 2,581,855 | 1/1952 | Griffith | 137/98 |
| 2,800,137 | 7/1957 | Fraser | 137/100 |
| 2,954,798 | 10/1960 | Mustee | 137/606 X |
| 3,192,939 | 7/1965 | Moen | 137/100 |

*Primary Examiner*—Stephen M. Hepperle
*Attorney, Agent, or Firm*—Browdy and Niemark

[57] ABSTRACT

A burnproof device of triple/double switch combination faucet, including a faucet main body having an L-shaped cold water inlet switch seat and an L-shaped hot water inlet switch seat on two sides. A communicating tube inward extends from the side of each of the cold and hot water inlet switch seats. A center of the main body is disposed with a controlling switch seat for controlling the discharging of the water from downward spout or upward sprinkler. The communicating tube communicates the cold and hot water inlet switch seats with the controlling switch seat. A switch is disposed at a transverse tube opening of each of the cold and hot water inlet switch seats for controlling the water to flow from the longitudinal inlet into the center of the main body and mix therein. The controlling switch of the controlling switch seat is used to control whether the water should be discharged from the spout or the sprinkler. The center of the communicating tube of the hot water switch seat is formed with a longitudinal circular water pipe seat. A bypass passage is disposed between the communicating tube of the cold water switch seat and the central controlling switch seat. The water is bypassed to rear side of the controlling switch seat to connect with the water pipe seat. A burnproof water pipe composed of an outer and an inner fitting pipes is fitted in the water pipe seat.

1 Claim, 5 Drawing Sheets

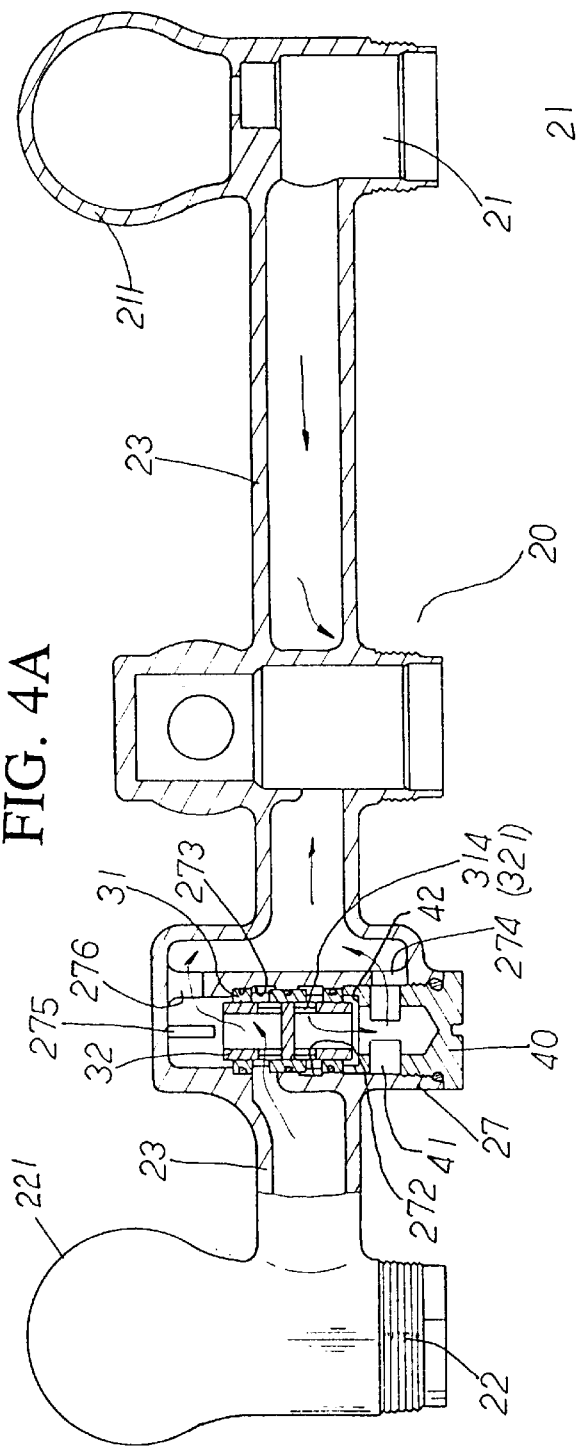
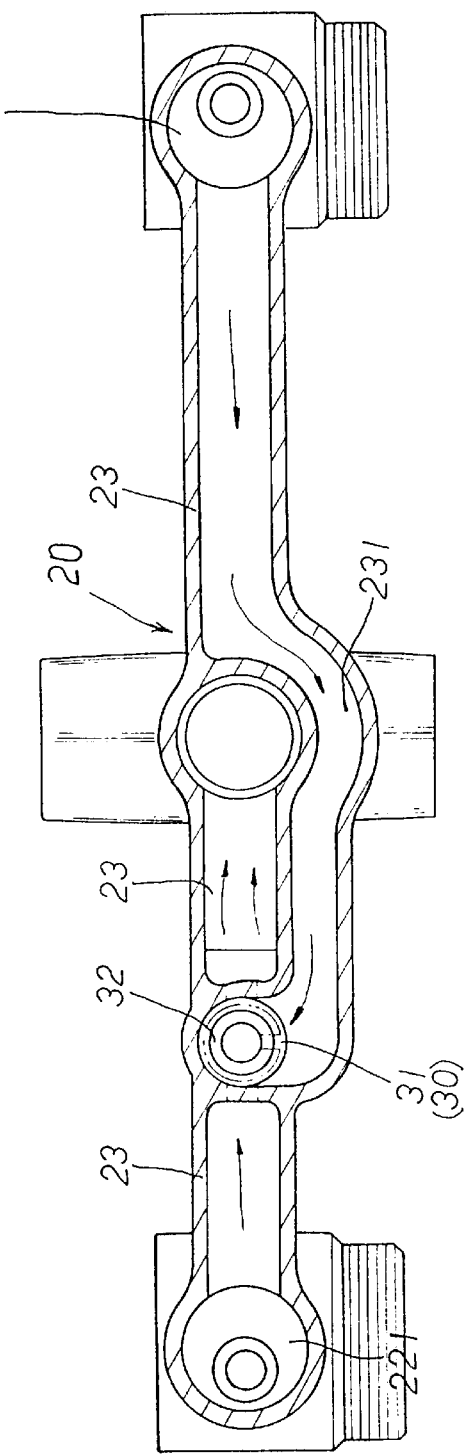
FIG. 4A
FIG. 4B he present invention relates to a burnproof device of triple/double switch combination faucet, including a faucet main body having an L-shaped cold water inlet switch seat and an L-shaped hot water inlet switch seat on two sides. A communicating tube inward extends from the side of each of the cold and hot water inlet switch seats. A center of the main body is disposed with a controlling switch seat for controlling the discharging of the water from downward spout or upward sprinkler. The center of the communicating tube of the hot water switch seat is formed with a longitudinal circular water pipe seat. A bypass passage is disposed between the communicating tube of the cold water switch seat and the central controlling switch seat. A burnproof water pipe composed of an outer and an inner fitting pipes is fitted in the water pipe seat. In the case that the cold water pressure is reduced to be less than that of the hot water, the diaphragm of the inner fitting pipe is upward pushed away from the symmetrical position by the hot water pressure, whereby the slots of the inner and outer fitting pipes are disaligned from each other, preventing the hot water from further going into the inner fitting pipe. At this time, only the cold water flows out from the upper end opening of the inner fitting pipe and the upper water outlet of the water pipe seat to the communicating tube on outer side of the water pipe seat so as to protect the user from being burned by the hot water.

FIG. 1 shows a conventional triple switch combination faucet structure. The faucet main body 10 includes an L-shaped cold water inlet switch seat 11 and an L-shaped hot water inlet switch seat 12 on two sides. A communicating tube 13 inward extends from the inner side of each of the cold and hot water inlet switch seats 11, 12. The center of the main body is disposed with a controlling switch seat 14 for controlling the discharging of the water from downward spout or upward sprinkler. The communicating tube 13 communicates the cold and hot water inlet switch seats 11, 12 with the controlling switch seat 14. A switch 15 is disposed at a transverse tube opening of each of the cold and hot water inlet switch seats 11, 12 for controlling the water to flow from the longitudinal inlet 111, 121 into the center of the main body and mix therein. Then the controlling switch 16 of the controlling switch seat 14 is used to control whether the water should be discharged from the spout or the sprinkler.

The above faucet structure can only adjust the ratio of the cold water to the hot water so as to adjust the temperature of the water. However, the existing users of the tap water often suffer low water pressure and need to use a pressurizing motor to increase the water pressure. The water pressure after pressurized is often still insufficient due to using of water of the peripheral toilet or faucet. Therefore, the cold water pressure is reduced and the cold water in the combination faucet is reduced so that the ratio of the cold water to the hot water is lowered. As a result, the mixed water becomes hotter and this may lead to burn wound of the user.

SUMMARY OF THE INVENTION

It is therefore a primary object of the present invention to provide a burnproof device of triple/double switch combination faucet. The center of the communicating tube of the hot water switch seat is formed with a longitudinal circular water pipe seat. A bypass passage is disposed between the communicating tube of the cold water switch seat and the central controlling switch seat for bypassing the cold water to the rear side of the controlling switch seat to communicate with the water pipe seat. A burnproof water pipe composed of an outer and an inner fitting pipes is fitted in the water pipe seat. The circumferential slots of the inner and outer fitting pipes permit the cold and hot water to evenly respectively flow from the upper and lower slots into the inner fitting pipe and be isolated by the diaphragm and kept in a balanced state, the cold and hot waters then respectively flow out of the upper and lower end openings of the inner fitting pipe and the upper and lower water outlets of the water pipe seat to be mixed in the communicating tube on outer side of the water pipe seat. In the case that the cold water pressure is reduced to be less than that of the hot water, the diaphragm of the inner fitting pipe is upward pushed away from the symmetrical position by the hot water pressure, whereby the slots of the inner and outer fitting pipes are disaligned from each other, preventing the hot water from further going into the inner fitting pipe. At this time, only the cold water flows out from the upper end opening of the inner fitting pipe and the upper water outlet of the water pipe seat to the communicating tube on outer side of the water pipe seat so as to protect the user from being burned by the hot water.

The present invention can be best understood through the following description and accompanying drawings, wherein:

BRIEF DESCRIPTION OF THE DRAWINGS

FIG. 4 is a sectional view showing the mixing of the cold and hot water; and

DETAILED DESCRIPTION OF THE PREFERRED EMBODIMENT

Figure 1:
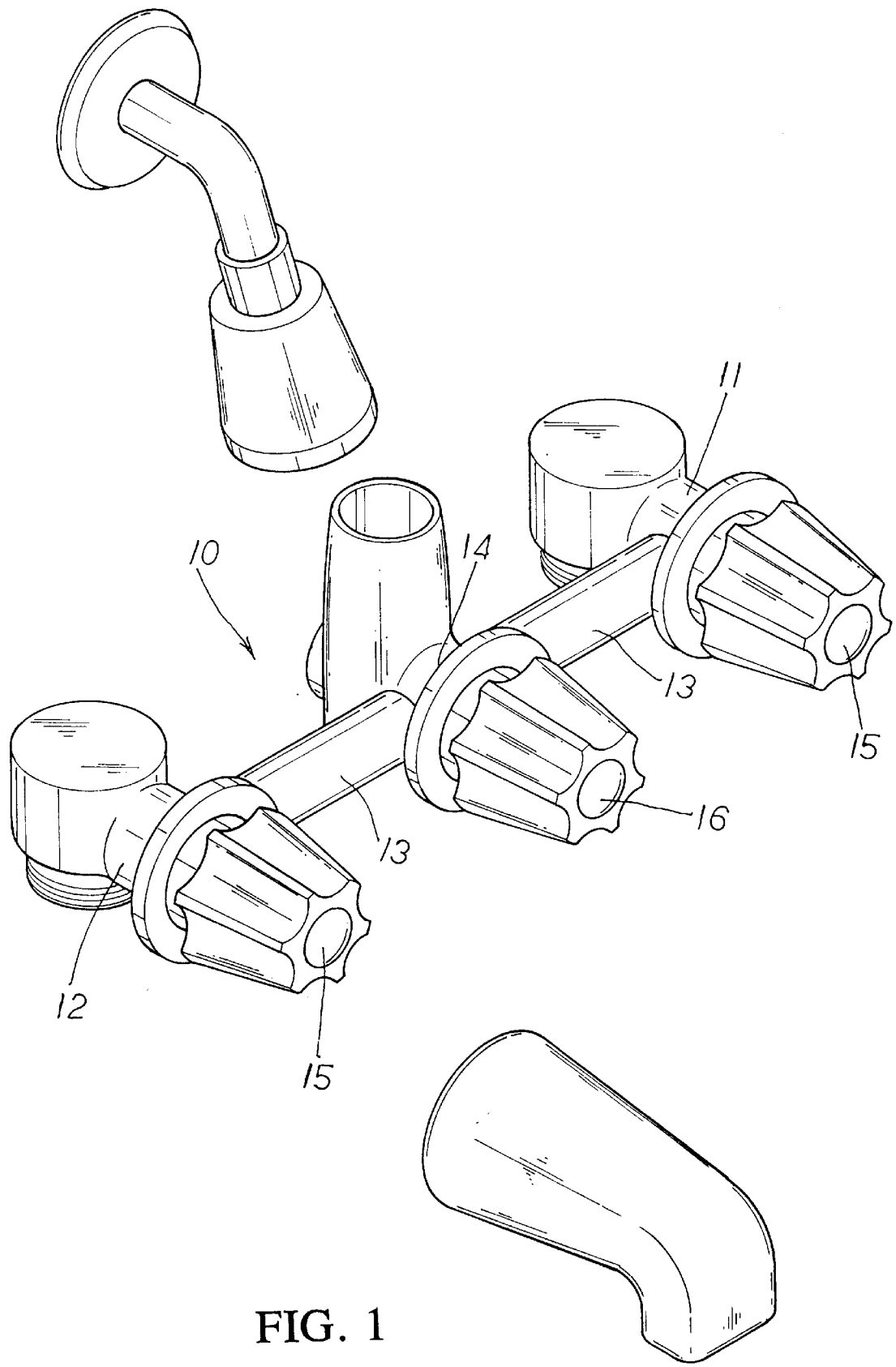
FIG. 1 is a perspective view of a conventional triple switch combination faucet structure.
Figure 2:
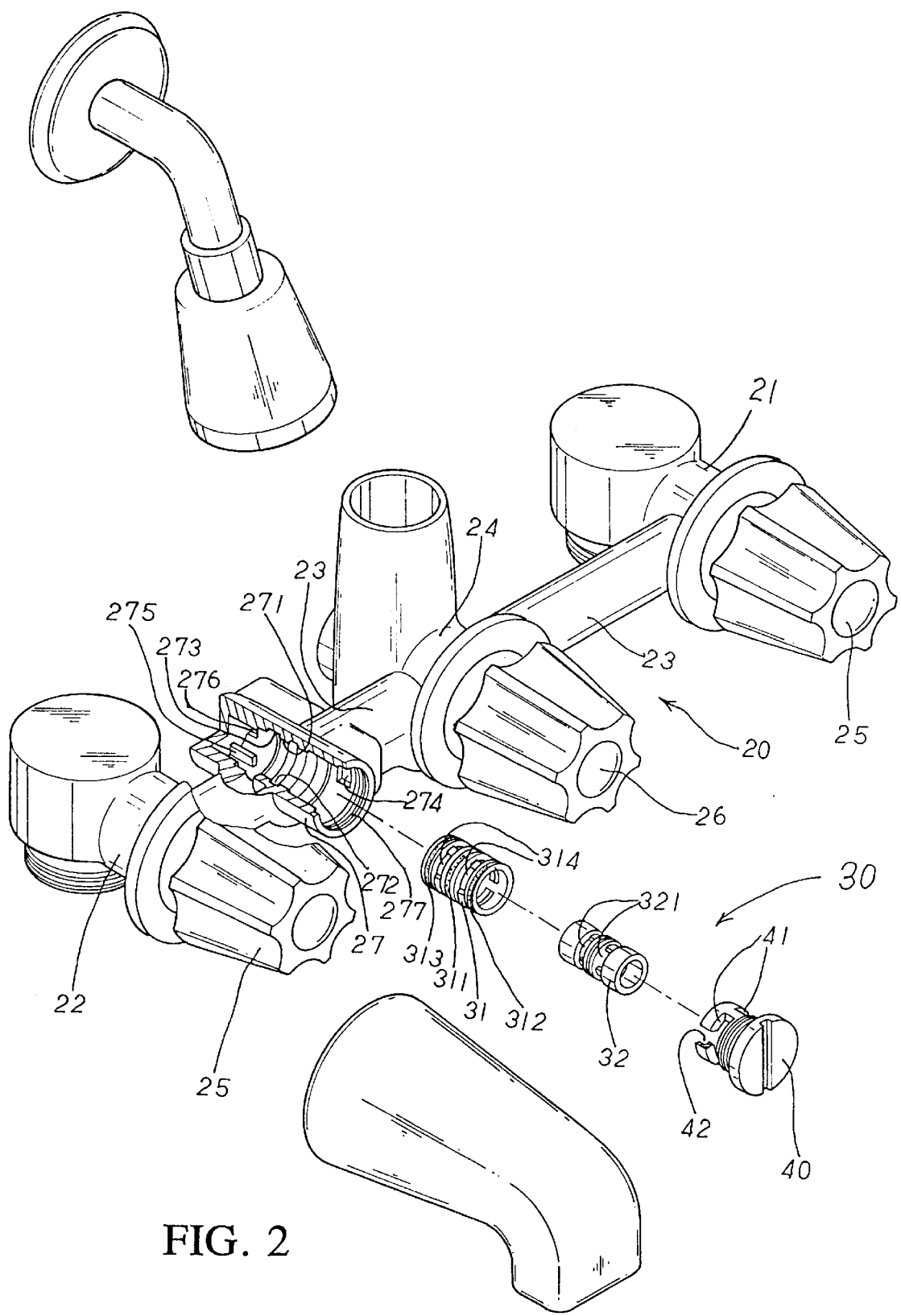
FIG. 2 is a perspective disassembled and partially sectional view of the present invention.

Please refer to FIG. 2. The combination faucet of the present invention includes a faucet main body 20 including an L-shaped cold water inlet switch seat 21 and an L-shaped hot water inlet switch seat 22 on two sides. A communicating tube 23 inward extends from the inner side of each of the cold and hot water inlet switch seats 21, 22. The center of the main body is disposed with a controlling switch seat 24 for controlling the discharging of the water from downward spout or upward sprinkler. The communicating tube 23 communicates the cold and hot water inlet switch seats 21, 22 with the controlling switch seat 22. A switch 25 is disposed at a transverse tube opening of each of the cold and hot water inlet switch seats 21, 22 for controlling the water to flow from the longitudinal inlet 211, 221 into the center of the main body and mix therein. Then the controlling switch 26 of the controlling switch seat 24 is used to control whether the water should be discharged from the spout or the sprinkler. The center of the communicating tube 23 of the hot water switch seat 22 is formed with a longitudinal circular water pipe seat 27. A bypass passage 231 is disposed between the communicating tube 23 of the cold water switch seat 21 and the central controlling switch seat 24 (as shown in FIG. 4). The water is bypassed to rear side of the controlling switch seat 24 to connect with the water pipe seat 27. A burnproof water pipe 30 composed of an outer and an inner fitting pipes 31, 32 is fitted in the water pipe seat 27. The middle section of the interior of the water pipe seat 27 is disposed with a water sealing fitting section 271. The inner wall thereof is watertightly fitted with a burnproof water sealing pipe 30 having a water sealing ring 311. An upper and a lower shallow annular grooves 272, 273 are formed between the upper and lower sides of the water sealing fitting section 271 for watertightly engaging with the water sealing rings 312, 313 fitted around the burnproof water sealing pipe 30. The upper annular groove 272 is communicated with the bypass passage 231 on rear side of the controlling switch seat 24. The outer wall of the water pipe seat 27 is formed with an upper water outlet 274 above the upper annular groove 272. The communicating tube 23 of the hot water switch seat 22 is communicated with the section between the lower annular groove 273 and the water sealing fitting section 271. A stopper plate 275 is disposed on the water pipe seat 27 below the lower annular groove 271 for preventing the inner fitting pipe 32 of the burnproof water sealing pipe 30 from dropping to the bottom of the water pipe seat 27. The wall of the lower annular groove 271 near the controlling switch seat 24 is disposed with a lower water outlet 276. The upper and lower water outlets 274, 276 of the water pipe seat 27 are communicated with the communicating tube 23. The upper end opening of the water pipe seat 27 is formed with inner thread 277 in which a clog body 40 is screwed. The clog body 40 is formed with a water outlet hole 41 on lower section and a stepped edge 42 on inner side for abutting against the outer fitting pipe 31 of the burnproof water sealing pipe 30 and preventing the inner fitting pipe 32 from being excessively upward flushed to the top of the clog body 40.

Figure 3:
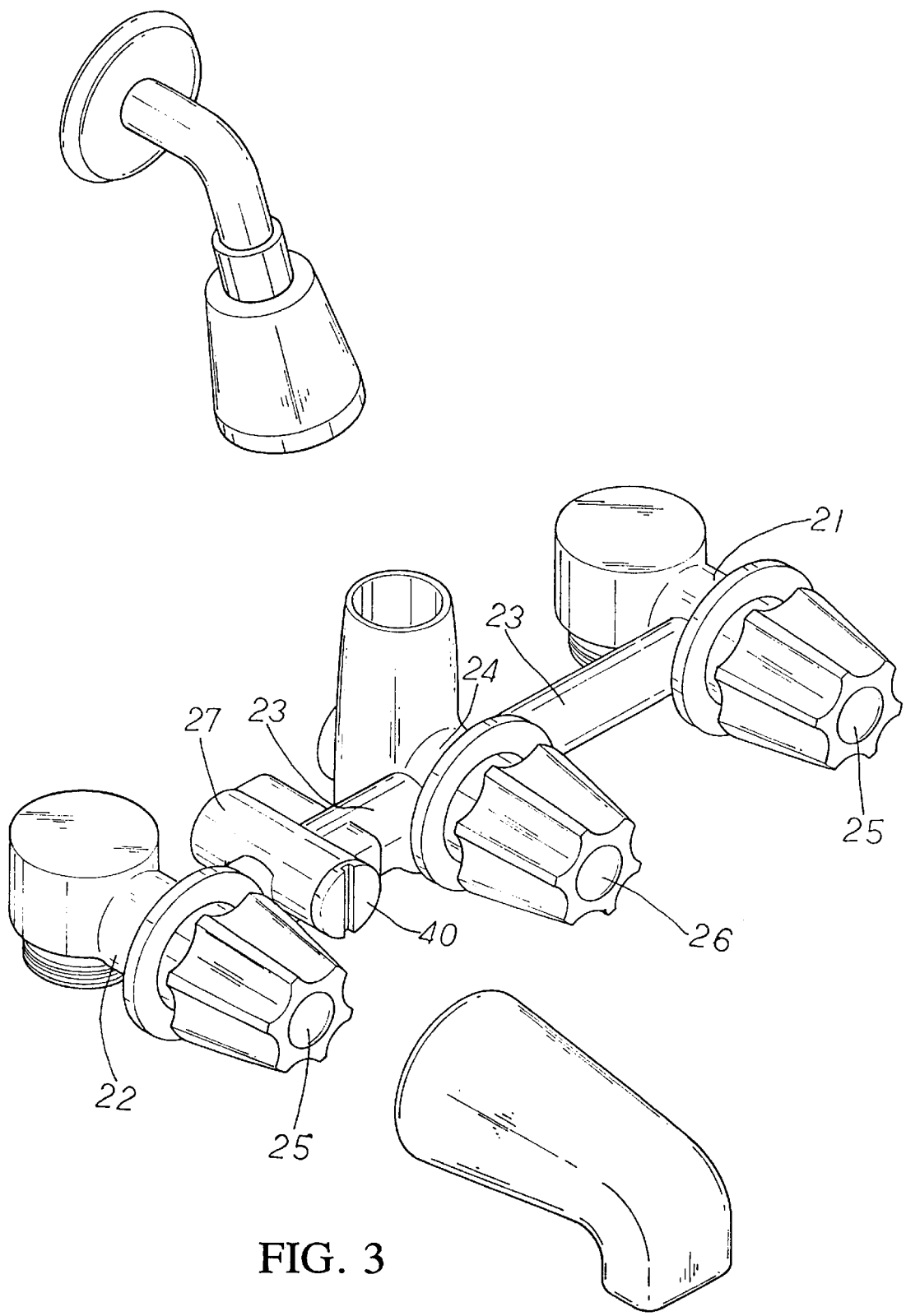
FIG. 3 is a perspective assembled view of the present invention.

Three water sealing rings 312, 311, 313 are respectively fitted in fitting grooves of upper, middle and lower sections of the outer fitting pipe 31 of the burnproof water sealing pipe 30. The inner walls between the three water sealing rings 312, 311, 313 are formed with circumferential slots 314 at intervals. The center of the interior of the inner fitting pipe 32 is disposed with a diaphragm. The walls of upper and lower sides of the diaphragm are also formed with circumferential slots 321 at intervals. The outer and inner fitting pipes 31, 32 are fitted with each other and then longitudinally installed into the water pipe seat 27 with the circumferential slots 314, 321 of the outer and inner fitting pipes 31, 32 respectively aligned with the upper and lower annular grooves 272, 273 of the water sealing fitting section 271 as shown in FIG. 3.

Referring to FIG. 4, when the water pressures of the incoming water from two sides are equal to each other, the opposite slots 314, 321 of the inner and outer fitting pipes 31, 32 permit the cold and hot water to evenly respectively flow from the upper and lower slots 314, 321 into the inner fitting pipe 32 and be isolated by the diaphragm and kept in a balanced state. The cold and hot waters then respectively flow out of the upper and lower end openings of the inner fitting pipe 32 and the upper and lower water outlets 274, 276 of the water pipe seat 27 to be mixed in the communicating tube 23 on outer side of the water pipe seat 27 (as shown by the bi-arrow). Then the water goes into the controlling switch seat and switched by the controlling switch to flow upward to the sprinkler or downward to the spout.

Figure 5:
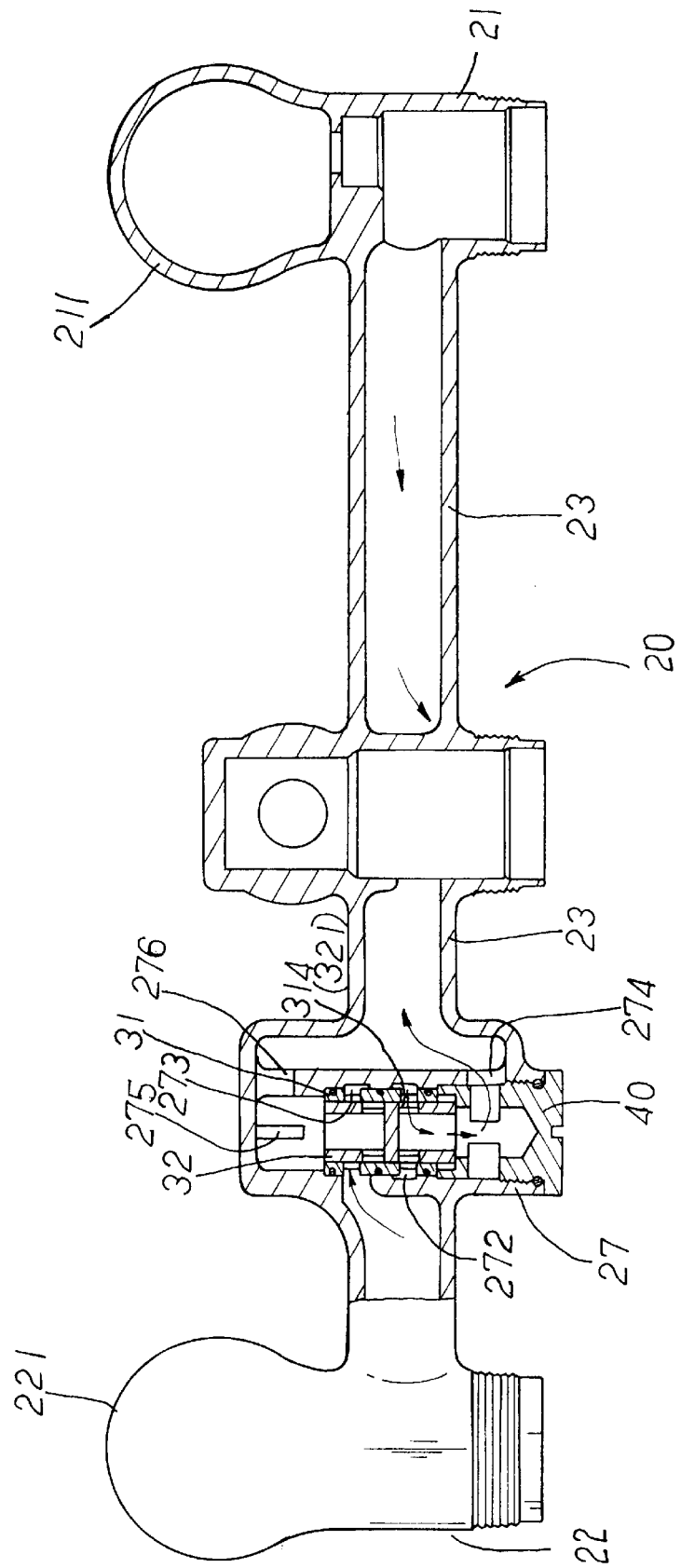
FIG. 5 is a sectional view showing that the hot water is stopped from going into the inner fitting pipe.

Referring to FIG. 5, in the case that the cold water pressure is reduced to be less than that of the hot water, the diaphragm of the inner fitting pipe 32 is upward pushed away from the symmetrical position by the hot water pressure, whereby the slots 314, 321 of the inner and outer fitting pipes 31, 32 are disaligned from each other, preventing the hot water from further going into the inner fitting pipe 32. At this time, only the cold water flows out from the upper end opening of the inner fitting pipe 32 and the upper water outlet 274 of the water pipe seat 27 to the communicating tube 23 on outer side of the water pipe seat 27 (as shown by the arrow) so as to protect the user from being burned by the hot water.

The above arrangement is also applicable to double switch combination faucet. Similarly, the communicating tube of the hot water switch seat is formed with a central longitudinal circular water pipe seat. A bypass passage is formed between the communicating tube of the cold water switch seat and the central controlling switch seat, whereby the water is bypassed to rear side of the controlling switch seat and communicated with the water pipe seat. A burnproof water sealing pipe composed of an inner and an outer fitting pipes is fitted in the water pipe seat. The double switch combination faucet is different from the triple switch combination faucet only in the structure of the central controlling switch seat.

The above embodiment is only an example of the present invention and the scope of the present invention should not be limited to the example. Any modification or variation derived from the example should fall within the scope of the present invention.

What is claimed is:

1. A burnproof device of triple/double switch combination faucet, comprising a faucet main body including an L-shaped cold water inlet switch seat and an L-shaped hot water inlet switch seat on two sides, a communicating tube inward extending from the side of each of the cold and hot water inlet switch seats, a center of the main body being disposed with a controlling switch seat for controlling the discharging of the water from downward spout or upward sprinkler, the communicating tube communicating the cold and hot water inlet switch seats with the controlling switch seat, a switch being disposed at a transverse tube opening of each of the cold and hot water inlet switch seats for controlling the water to flow from the longitudinal inlet into the center of the main body and mix therein, the controlling switch of the controlling switch seat being used to control whether the water should be discharged from the spout or the sprinkler, the center of the communicating tube of the hot water switch seat being formed with a longitudinal circular water pipe seat, a bypass passage being disposed between the communicating tube of the cold water switch seat and the central controlling switch seat, the water being bypassed to rear side of the controlling switch seat to connect with the water pipe seat, a burnproof water pipe composed of an outer and an inner fitting pipes being fitted in the water pipe seat, the middle section of the interior of the water pipe seat being disposed with a water sealing fitting section, the inner wall thereof being watertightly fitted with a burnproof water sealing pipe having a water sealing ring, an upper and a lower shallow annular grooves being formed between the upper and lower sides of the water sealing fitting section for watertightly engaging with the water sealing rings fitted around the burnproof water sealing pipe, the upper annular groove being communicated with the bypass passage on rear side of the controlling switch seat, the outer wall of the water pipe seat being formed with an upper water outlet above the upper annular groove, the communicating tube of the hot water switch seat being communicated with the section between the lower annular groove and the water sealing fitting section, a stopper plate being disposed on the water pipe seat below the lower annular groove for preventing the inner fitting pipe of the burnproof water sealing pipe from dropping to the bottom of the water pipe seat, the wall of the lower annular groove near the controlling switch seat being disposed with a lower water outlet, the upper and lower water outlets of the water pipe seat being communicated with the communicating tube, the upper end opening of the water pipe seat being formed with inner thread in which a clog body is screwed, the clog body being formed with a water outlet hole on lower section and a stepped edge on inner side for abutting against the outer fitting pipe of the burnproof water sealing pipe and preventing the inner fitting pipe from being excessively upward flushed to the top of the clog body, three water sealing rings being respectively fitted in fitting grooves of upper, middle and lower sections of the outer fitting pipe of the burnproof water sealing pipe, the inner walls between the three water sealing rings being formed with circumferential slots at intervals, the center of the interior of the inner fitting pipe being disposed with a diaphragm, the walls of upper and lower sides of the diaphragm being also formed with circumferential slots at intervals, the outer and inner fitting pipes being fitted with each other and then longitudinally installed into the water pipe seat with the circumferential slots of the outer and inner fitting pipes respectively aligned with the upper and lower annular grooves of the water sealing fitting section, whereby when the water pressures of the incoming water from two sides are equal to each other, the opposite slots of the inner and outer fitting pipes permit the cold and hot water to evenly respectively flow from the upper and lower slots into the inner fitting pipe and be isolated by the diaphragm and kept in a balanced state, the cold and hot waters then respectively flow out of the upper and lower end openings of the inner fitting pipe and the upper and lower water outlets of the water pipe seat to be mixed in the communicating tube on outer side of the water pipe seat, and then the water goes into the controlling switch seat and switched by the controlling switch to flow upward to the sprinkler or downward to the spout, while in the case that the cold water pressure is reduced to be less than that of the hot water, the diaphragm of the inner fitting pipe is upward pushed away from the symmetrical position by the hot water pressure, whereby the slots of the inner and outer fitting pipes are disaligned from each other, preventing the hot water from further going into the inner fitting pipe, at this time, only the cold water flowing out from the upper end opening of the inner fitting pipe and the upper water outlet of the water pipe seat to the communicating tube on outer side of the water pipe seat so as to protect the user from being burned by the hot water.

\* \* \* \* \*